United States Patent Office

2,727,890
Patented Dec. 20, 1955

2,727,890

SYNTHESIS OF AN ALDOHEXOSIDE OF A FLAVONOL

Simon H. Wender, Norman, Okla., and Clark H. Ice, Aiken, S. C., assignors to the United States of America as represented by the United States Atomic Energy Commission No Drawing. Application March 2, 1953, Serial No. 339,928

5 Claims. (Cl. 260—210)

Our invention relates to a method for the synthesis of an aldohexoside of a flavonol, and more particularly, to the synthesis of isoquercitrin.

The flavonoid compounds comprise a very important class of plant pigments which are widely distributed in the vegetable kingdom. Interest is shown in a number of these compounds due to their vitamin-like action in increasing the resistance of blood capillaries to rupture. The term "vitamin P" is sometimes applied to flavonoids having this property. It is believed that flavonoids will be of use in the control of radiation injury, and considerable experimental effort is being expended in this direction. There is, therefore, considerable demand for such types of compounds for both practical and experimental purposes. Rutin, a member of this class of pigments enjoys widespread use as a drug for blood vessel treatment, and it is believed that aldohexosides of flavonols may have similar properties in this respect. In particular, it is believed that isoquercitrin, an aldohexoside of a flavonol, possesses an activity equal to or greater than that of rutin.

In the past, aldohexosides of flavonols have had to be isolated from naturally-occurring substances. Since they usually occur in trace quantities, the isolation of aldohexosides of flavonols in substantially-pure form and in relatively large quantities has been exceedingly difficult to achieve. Alcohol extracts of naturally occurring source materials have often been used in conjunction with subsequent crystallization procedures. However, alcohol also extracts many resinous-like materials which interfere with crystallization. Water extracts have sometimes been employed to avoid the latter disadvantages, but, because of the usual lesser solubilities of flavonoids in water, unusually large volumes of water are necessary, with subsequently costly evaporations. In addition, interfering inorganic ions and some sugars are often coextracted. Thus, regardless of the solvent used, the steps necessary to obtain a relatively pure concentrate have usually been complicated, and considerable flavonoid losses have occurred. In addition, a purification step often used in the past in the isolation of aldohexosides of flavonols from natural products involves the preparation of the lead salt of the flavonoid. This precipitate is separated, then suspended in a solvent such as alcohol, and decomposed with hydrogen sulfide. The resulting lead sulfide precipitate is then separated from the remaining supernatant flavonoid solution. However, not only is the use of hydrogen sulfide disagreeable, but flavonoid losses are significant.

All these prior art methods thus required the handling of large quantities of natural materials in order to obtain very small quantities of the desired product, and were attended by numerous inconveniences. These difficulties could be avoided by a direct synthesis of the desired compound. However, until now, such methods have not been available.

An object of our invention, therefore, is to provide a method for the synthesis of an aldohexoside of a flavonol.

Another object of our invention is to provide a method for the synthesis of isoquercitrin.

Still another object of our invention is to provide an economical and rapid method for the synthesis of isoquercitrin.

Further objects and advantages of our invention will be apparent from the following detailed description.

In accordance with our invention, an aldohexoside of a flavonol may be synthesized by contacting an alkali salt of a flavonol with an acetohaloaldohexose in liquid ammonia, and recovering the resulting aldohexoside of the flavonol from the resulting reaction mixture.

Employing our method, aldohexosides of flavonols may be synthesized relatively rapidly, easily and in good yield. The starting materials are generally available at comparatively low cost, thus making our process economically feasible, and large quantities of accompanying impurities need not be handled.

We find that any of the flavonols may be used satisfactorily in our invention, while we prefer the polyhydroxy substituted flavonols and their methylated derivatives.

Thus, Table I, following, is illustrative of flavonols, any of which, in their alkali salt form, may be condensed with any acetohaloaldohexose by the methods herein described to form the corresponding aldohexoside.

TABLE I

1. Morin-(2′,3,4′,5,7-pentahydroxyflavone)
2. Nortangeretin-(3,4′,5,6,7-pentahydroxyflavone)
3. Patuletin (3,3′,4′,5,7-pentahydroxy-6-methoxyflavone)
4. Quercetin (3,3′,4′,5,7-pentahydroxyflavone)
5. Rhamnetin (3,3′,4′,5-pentahydroxy-7-methoxyflavone)
6. Robinetin (3,3′,4′,5′,7-pentahydroxyflavone)
7. Gossypetin-(3,3′,4′,5,7,8-hexahydroxyflavone)
8. Kaempferol-(3,4′,5,7-tetrahydroxyflavone)
9. Quercetagetin-(3,3′,4′,5,6,7-hexahydroxyflavone)

Table II, following, is illustrative of the aldohexoses which, in their acetohalogen form, may be condensed, by our method, with an alkali salt of one of the flavonols listed in Table I to form an aldohexoside.

TABLE II

1. Glucose.
2. Mannose
3. Cocaose
4. Galactose
5. Gulose
6. Talose
7. Idose
8. Altrose
9. Allose While eminently satisfactory results may be obtained with any acetohaloaldohexose, we prefer to employ an acetohaloglucose since glucose is the most readily available and the cheapest of the aldohexoses.

Although numerous solvents have been tried with the reactants herein disclosed, we find that liquid ammonia is the only solvent which is suitable for use with our invention.

The mole ratio of the acetohaloaldohexose to the alkali salt of a flavonol may vary from about 1 to 1 to about 10 to 1 with satisfactory yields. Sufficient liquid ammonia solvent should be present to dissolve the reactants, while an excess thereof is desirable.

The length of the reaction period is not critical. We find, however, that the time required for the liquid ammonia solvent to evaporate from the reaction vessel, without the application of external heat, suffices for the reaction to reach completion. In view of its operational simplicity, this mode of reaction is preferred. The resulting aldohexoside of the flavonol may be easily recovered by a number of methods from the solid residue remaining after the ammonia evaporation. We prefer, however, to employ the method taught in co-pending application Serial No. 323,505, filed December 1, 1952, in the names of Simon H. Wender and Clark H. Ice. In brief, after the liquid ammonia solvent is evaporated, the resulting residue containing the aldohexoside is dissolved in an organic solvent and passed through a Magnesol column. ("Magnesol" is the trade name for a hydrous magnesium silicate adsorbent sold by the Food Machinery and Chemical Corporation, Westvaco Chemical Division, New York, N. Y.) The resulting adsorbed compounds may then be chromatographically eluted from the column, and the pure aldohexoside portion of the eluate separately collected.

In a preferred form of our invention, an alkali salt of a flavonol is placed in a reaction vessel, and liquid ammonia added, followed by an acetohaloaldohexose. The liquid ammonia is permitted to evaporate from the reaction vessel without the application of external heat. After the evaporation of the liquid ammonia is complete, the resulting residue is extracted with an organic solvent, such as methanol, and the resulting solution allowed to stand for approximately 24 hours. The solution may then be filtered and the solvent removed from the resulting filtrate by distillation at reduced pressure. The aldohexoside of the flavonol is recovered from the resulting residue by the method of Wender and Ice referred to above.

The following examples illustrate our invention in greater detail.

*Example I*

A 0.2 gram sample of the potassium salt of quercetin was placed in a reaction vessel which was protected from the entrance of moisture, and 50 milliliters of liquid ammonia were added. Approximately 0.4 gram of acetobromoglucose was then added to the reaction mixture and the ammonia allowed to evaporate at room temperature without the application of external heat. The residue was extracted with 50 milliliters of methyl alcohol and the resulting solution allowed to stand for 24 hours. The solution was then filtered through a sintered glass filter and the methyl alcohol was removed from the filtrate by distillation at reduced pressure. The residue resulting from the distillation was dissolved in 10 milliliters of methyl alcohol and the solution passed through a 1 inch Magnesol column. The column was eluted with a water-saturated ethyl acetate solution and the brown hexoside band collected as a separate fraction. This fraction was taken to dryness by distillation at reduced pressure. The product was recrystallized from water, and the yield was 25 milligrams. Mixed chromatograms of the product with pure isoquercitrin substantiated the identity of the product as pure isoquercitrin.

*Example II*

The procedure of Example I was followed except that the sodium salt of morin and acetochloromannose were employed instead of the quercetin salt and acetobromoglucose. A pure sample of the 3-aldomannoside of morin was recovered.

In general, it may be said that the above examples are merely illustrative and should not be construed as limiting the scope of our invention. For example, the alkali salt of the flavonol may be formed directly in the liquid ammonia solution by adding the flavonol to a liquid ammonia solution containing an equimolar amount of an alkali amide such as sodium amide. Following this, the acetohaloaldohexose may be added to the solution to form the aldohexoside of the flavonol. Our invention should, therefore, be understood to be limited only as indicated by the appended claims.

What we claim is:

1. A method for the synthesis of an aldohexoside of a flavonol which comprises contacting an acetohaloaldohexose with an alkali salt of said flavonol in liquid ammonia, and recovering the resulting aldohexoside of said flavonol from the resulting reaction mixture.

2. A method for the synthesis of isoquercitrin, which comprises contacting an alkali salt of quercetin with an acetohaloaldohexose in liquid ammonia, and recovering the resulting isoquercitrin from the resulting reaction mixture.

3. A method for the synthesis of isoquercitrin which comprises contacting the potassium salt of quercetin with acetobromoglucose in liquid ammonia, and recovering the resulting isoquercitrin from the resulting reaction mixture.

4. A method for the synthesis of isoquercitrin which comprises contacting in liquid ammonia the potassium salt of quercetin with acetobromoglucose in a mole ratio of approximately 1 to 1 to approximately 1 to 10, evaporating said liquid ammonia, and recovering the resulting isoquercitrin from the resulting reaction mixture.

5. A method for the synthesis of an aldohexoside of morin, which comprises contacting an alkali salt of morin with an acetohaloaldohexose in liquid ammonia, and recovering the resulting aldohexoside of morin from the resulting reaction mixture.

References Cited in the file of this patent

UNITED STATES PATENTS

| | | |
|---|---|---|
| 2,218,569 | White | Oct. 22, 1940 |
| 2,224,807 | Bockmuhl et al. | Dec. 10, 1940 |

OTHER REFERENCES

Pigman: "Chemistry of the Carbohydrates," Academic Press, 1948, p. 162.